UNITED STATES PATENT OFFICE.

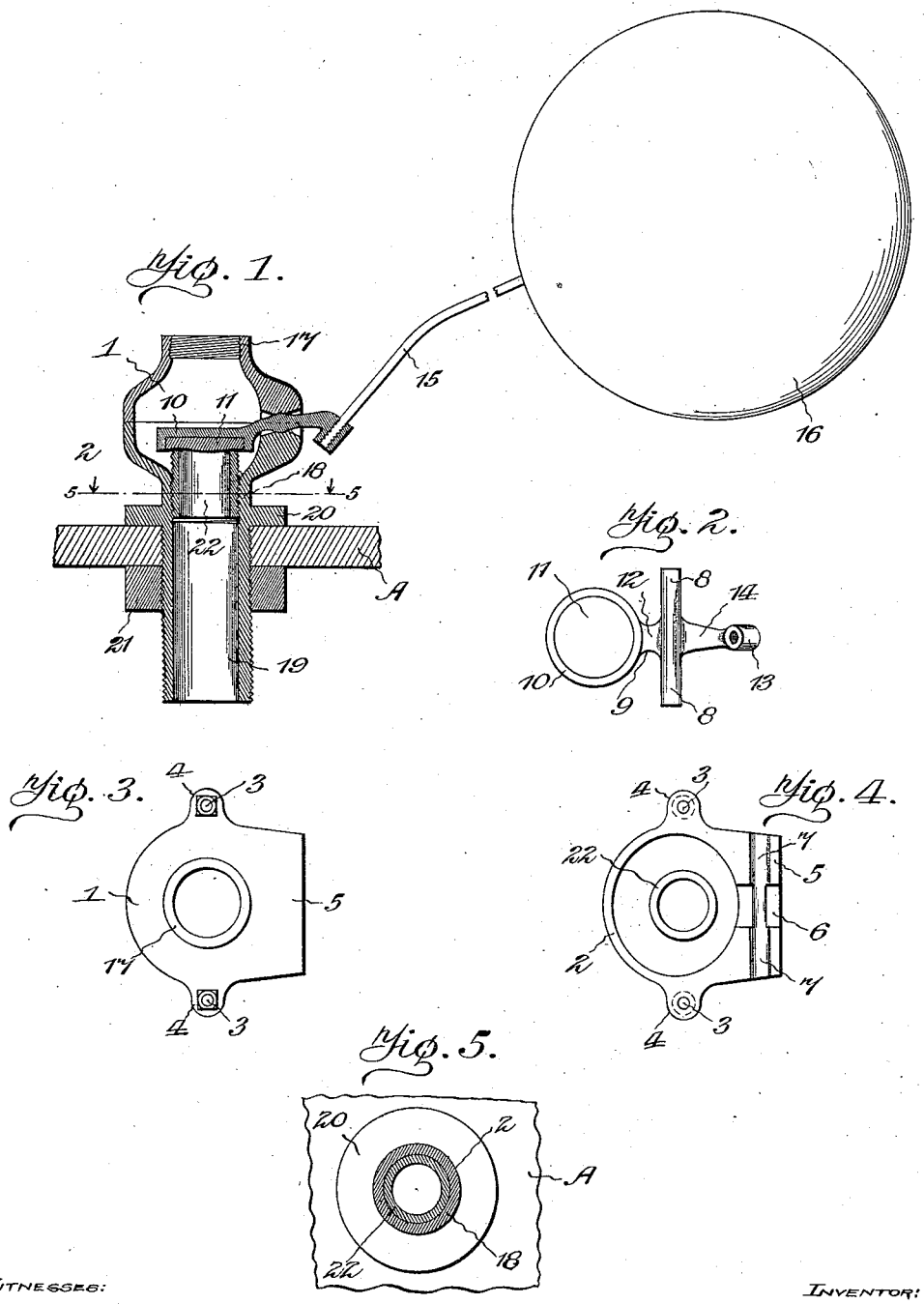

CHARLES A. ROBBINS, OF DIXON, ILLINOIS.

TANK-VALVE.

1,015,980.  Specification of Letters Patent.  Patented Jan. 30, 1912.

Application filed March 27, 1911. Serial No. 617,075.

*To all whom it may concern:*

Be it known that I, CHARLES A. ROBBINS, a citizen of the United States, residing at Dixon, in the county of Lee and State of Illinois, have invented certain new and useful Improvements in Tank-Valves, of which the following is a specification.

My present invention relates to valves especially adapted to closet tanks, of that type which are controlled in their action by floats, my object being to provide an extremely simple and inexpensive valve embodying a minimum number of parts, and which will be positive in its action and strong and lasting in use.

With this in mind my invention resides in the construction and arrangement of parts to be hereinafter described with reference to the accompanying drawing, in which—

Figure 1 is a central vertical section through my improved valve. Fig. 2 is a bottom plan view of the valve piece removed. Fig. 3 is a top plan view of the upper part of the casing removed. Fig. 4 is a top plan view of the lower part of the casing removed, and Fig. 5 is a cross-section through the valve taken on the line 5—5 of Fig. 1.

Referring now to these figures, the casing of my improved valve comprises upper and lower hollow, and substantially semi-circular portions 1 and 2, which are coupled together in use by small bolts 3 through diametrically opposite side ears 4, and which are provided with lateral portions 5 extended in one direction. The inner contacting surfaces of these lateral portions 5 are provided with central longitudinal grooves 6 and transverse semi-circular grooves 7 which, when together, for circular openings to receive the transverse trunnions 8 extending from the central portion of a valve member 9. The valve member 9, as particularly shown in Fig. 2, comprises a circular valve piece 10 at one end, one surface of which has a circular recess to receive a suitable gasket 11 engageable with the valve seat to be hereinafter described; this valve piece 10 being integrally united with the trunnions 8 by a small rib 12. At the opposite end of the valve member is an angular internally threaded tubular piece 13, integrally united with the trunnions 8 by a rib 14, adapted to receive a threaded end of a rod 15 which carries the float, usually in the form of a ball 16 as shown in Fig. 1.

The upper casing portion 1 has an upper apertured boss 17, which may be internally threaded as shown in Fig. 1 so as to receive a re-fill pipe when it is used in connection with a "low-down" tank. The lower casing portion 2 has a constricted neck 18, and a tubular extension 19, and is also provided with a circular flange 20 around its said extension 19. The extension 19, as shown particularly in Fig. 1, is externally threaded and adapted to extend downwardly through an opening formed in the base A of a tank and to receive a nut 21 thereon, to bear upwardly against the lower surface of the tank base, in opposition to the flange 20 which bears downwardly against the upper surface of the tank base, thereby locking the valve in position within the tank. The neck 18, as shown, is internally threaded, to receive a small tube 22, the upper end of which forms a valve seat as shown in Fig. 1. Thus with the parts coupled as shown in Fig. 1, in their proper relation, valve member 9 will be rocked upon its trunnions 8 and its valve piece 10 raised from its seat upon the upper end of the tube 22, by the downward movement of the ball float 16 when the tank empties, thus opening the valve and permitting the entrance of re-filling water from the service pipe which is connected to the tubular extension 19 of the lower casing portion 2. In like manner, as the re-filling water rises in the tank, the ball float 16 rises upon its surface, and rocks the valve member in the opposite direction to seat the valve piece 10 upon the tube 22 again.

I claim:

The combination of a valve casing having an inlet and an outlet, and comprising separably connected sections having portions of their contacting edges provided with registering recesses to form an opening from the interior of the casing to the outside thereof, and said contacting edges having registering recesses extending laterally from the first-mentioned recesses; and a valve member having a stem passing through the aforesaid opening, said stem being provided with trunnions which are mounted in the laterally extending recesses, and said valve member having a valve piece within the casing to engage the seat.

In testimony whereof I affix my signature in presence of two witnesses.

CHARLES A. ROBBINS.

Witnesses:
H. W. LEYDIG,
H. A. BROOKS.

Copies of this patent may be obtained for five cents each, by addressing the "Commissioner of Patents, Washington, D. C."